United States Patent
Rowlandson

(10) Patent No.: US 12,490,926 B2
(45) Date of Patent: Dec. 9, 2025

(54) SYSTEMS FOR SERIAL COMPARISON OF ELECTROCARDIOGRAMS

(71) Applicant: GE Precision Healthcare LLC, Wauwatosa, WI (US)

(72) Inventor: Gordon Ian Rowlandson, Fox Point, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 896 days.

(21) Appl. No.: 17/661,181

(22) Filed: Apr. 28, 2022

(65) Prior Publication Data

US 2023/0346293 A1    Nov. 2, 2023

(51) Int. Cl.
- *A61B 5/366* (2021.01)
- *A61B 5/00* (2006.01)
- *A61B 5/335* (2021.01)

(52) U.S. Cl.
CPC ............ *A61B 5/366* (2021.01); *A61B 5/0024* (2013.01); *A61B 5/335* (2021.01); *A61B 5/4848* (2013.01); *A61B 5/7246* (2013.01); *A61B 5/742* (2013.01); *A61B 5/7475* (2013.01); *A61B 2562/222* (2013.01)

(58) Field of Classification Search
CPC ....... A61B 5/366; A61B 5/0024; A61B 5/335; A61B 5/4848; A61B 5/7246; A61B 5/742; A61B 5/7475; A61B 2562/222; A61B 5/318; A61N 1/362

See application file for complete search history.

(56) References Cited

U.S. PATENT DOCUMENTS

| | | | |
|---|---|---|---|
| 7,076,287 | B2 | 7/2006 | Rowlandson |
| 7,203,542 | B2 | 4/2007 | Obel |
| 7,593,764 | B2 | 9/2009 | Kohls et al. |
| 7,783,341 | B2 | 8/2010 | Ricke et al. |
| 7,970,472 | B2 | 6/2011 | Ricke et al. |
| 8,170,655 | B2 | 5/2012 | Ricke et al. |

(Continued)

OTHER PUBLICATIONS

EP application 23168325.1 filed Apr. 17, 2023—Search Report issued Jul. 26, 2023; 9 pages.

(Continued)

*Primary Examiner* — John R Downey
(74) *Attorney, Agent, or Firm* — McCoy Russell LLP

(57) ABSTRACT

Systems are provided for detecting potential pacemaker lack of capture in surface electrocardiogram (ECG) signals. In one example, a system includes a plurality of electrodes configured to measure electrical potential generated at a skin of a patient, an electrode monitor configured to generate an ECG signal from the electric potential, an interface, a memory storing instructions, and at least one processor configured to execute the instructions to: obtain a baseline ECG signal of the patient, obtain a current ECG signal of the patient from the electrode monitor, determine, based on the baseline ECG signal and/or the current ECG signal, that the patient has an electronic implant carrying out biventricular pacing, compare, based on the determination, the baseline ECG signal to the current ECG signal of the patient, and indicate, through the interface, a degradation condition of the electronic implant based on the comparing and the determination.

20 Claims, 10 Drawing Sheets

(56) References Cited

U.S. PATENT DOCUMENTS

| | | | | |
|---|---|---|---|---|
| 2009/0318997 | A1* | 12/2009 | Ricke | A61N 1/3706 607/27 |
| 2016/0058317 | A1* | 3/2016 | Chien | A61B 5/7264 600/512 |
| 2016/0367801 | A1 | 12/2016 | Prinzen et al. | |
| 2018/0078778 | A1 | 3/2018 | Ternes | |
| 2020/0330771 | A1 | 10/2020 | Min | |

OTHER PUBLICATIONS

Tom Kenny: "Advanced Crt Ecg Analysis" In: "The Nuts and Bolts of Cardiac Resynchronization Therapy", Jan. 1, 2008 (Jan. 1, 2008), Blackwell Publishing, Inc, Malden, Massachusetts, USA, XP055171690, ISBN: 97814051537210 pp. 135-143, DOI: 10.1002/9780470751602. ch19.

Shea, J. et al., "Cardiac Resynchronization Therapy A Patient's Guide," Circulation, vol. 108, No. 9, Sep. 2, 2003, 4 pages.

Sweeney, M. et al., "A New Paradigm for Physiologic Ventricular Pacing," Journal of the American College of Cardiology, vol. 47, No. 2, Jan. 17, 2006, 7 pages.

Petrutiu, S. et al., "High resolution electrocardiogramaptimised for recording pulses from electronic pacemakers: Evaluation of a new pacemaker sensing system," Proceedings of the 2007 Computers in Cardiology, Sep. 30, 2007, Durham, North Carolina, 4 pages.

Ricke, A. et al., "Advanced pacemaker detection," Journal of Elecrocardiology, vol. 40, No. 6, Suppl. 1, Nov. 2007, 1 page.

Ricke, A. et al., "The relationship between programmed pacemaker pulse amplitude and the surface electrocardiogram recorded amplitude: application of a new high-bandwidth electrocardiogram system," Journal of Elecrocardiology, vol. 41, No. 6, Nov. 2008, Available Online Sep. 19, 2008, 5 pages.

Ricke, A. et al., "Improved pacemaker pulse detection: clinical evaluation of a new high-bandwidth electrocardiogram," Journal of Elecrocardiology, vol. 44, No. 2, Mar. 2011, 10 pages.

Koenig, J. et al., "Observations of pacemaker pulses in high-bandwidth electrocardiograms and Dower-estimated vectorcardiograms," Journal of Electrocardiology, vol. 44, No. 2, Mar. 2011, Available Online Dec. 3, 2010, 7 pages.

Biffi, M. et al., "Left ventricular lead stabilization to retain cardiac resynchronization therapy at long term: when is it advisable?," Europace, vol. 16, No. 4, Apr. 2014, Available Online Sep. 26, 2013, 8 pages.

Zanon, F. et al., "Multipoint pacing by a left ventricular quadripolar lead improves the acute hemodynamic response to CRT compared with conventional biventricular pacing at any site," Heart Rhythm, vol. 12, No. 5, May 1, 2015, Available Online Jan. 24, 2015, 7 pages.

De Pooter, J. et al., "Relation between electrical and mechanical dyssynchrony in patients with left bundle branch block: An electro- and vectorcardiographic study," Annals of Noninvasive Elecrocardiology, vol. 23, No. 4, Jul. 2018, Available Online Dec. 18, 2017, 9 pages.

Katbeh, A. et al., "Cardiac Resynchronization Therapy Optimization: A Comprehensive Approach," Cardiology, vol. 142, No. 2, 2019, Available Online May 22, 2019, 12 pages.

Chew, D. et al., "A Novel High-Resolution Surface Electrocardiogramethod to Identify and Characterize Myocardial Scar: A Proof-of-Concept Study," CJC Open, vol. 3, No. 10, May 27, 2021, 7 pages.

"Marquette 12SL—ECG Analysis Programs—Diagnostic Cardiology— Categories," GE Healthcare Website, Available Online at https://www.gehealthcare.com/en-GB/products/diagnostic-cardiology/marquette-12sl, Retrieved on Apr. 19, 2022, 5 pages.

\* cited by examiner

SYSTEMS FOR SERIAL COMPARISON OF ELECTROCARDIOGRAMS

TECHNICAL FIELD

Embodiments of the subject matter disclosed herein relate to electrocardiograms (ECGs), and more particularly, to detecting potential pacemaker lack of capture in ECG signals.

BACKGROUND

Electrocardiograph (ECG) monitors are widely used to obtain medical (e.g., biopotential) signals containing information indicative of electrical activity associated with the heart and pulmonary system of a patient. To obtain medical signals, ECG electrodes are applied to the skin of the patient in various locations. The electrodes, after being positioned on the patient, connect to an ECG monitor by a set of ECG lead wires. The ECG signals obtained with the electrodes may be processed into pacing and/or biopotential signals that may be evaluated by a clinician to diagnose or rule out various patient conditions such as acute myocardial infarction.

SUMMARY

In an embodiment, a system includes a plurality of electrodes configured to measure electrical potential generated at a skin of a patient, an electrode monitor configured to generate an electrocardiogram (ECG) signal from the electric potential measured by the plurality of electrodes, an interface for communicating with a user, a memory storing instructions, and at least one processor configured to execute the stored instructions to: obtain a baseline ECG signal of the patient, obtain a current ECG signal of the patient from the electrode monitor, determine, based on the baseline ECG signal and/or the current ECG signal, that the patient has an electronic implant carrying out biventricular pacing, compare, based on a determination that the electronic implant is carrying out biventricular pacing, the baseline ECG signal to the current ECG signal of the patient, and indicate, through the interface, a degradation condition of the electronic implant based on the comparing and the determination that the electronic implant is carrying out biventricular pacing.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
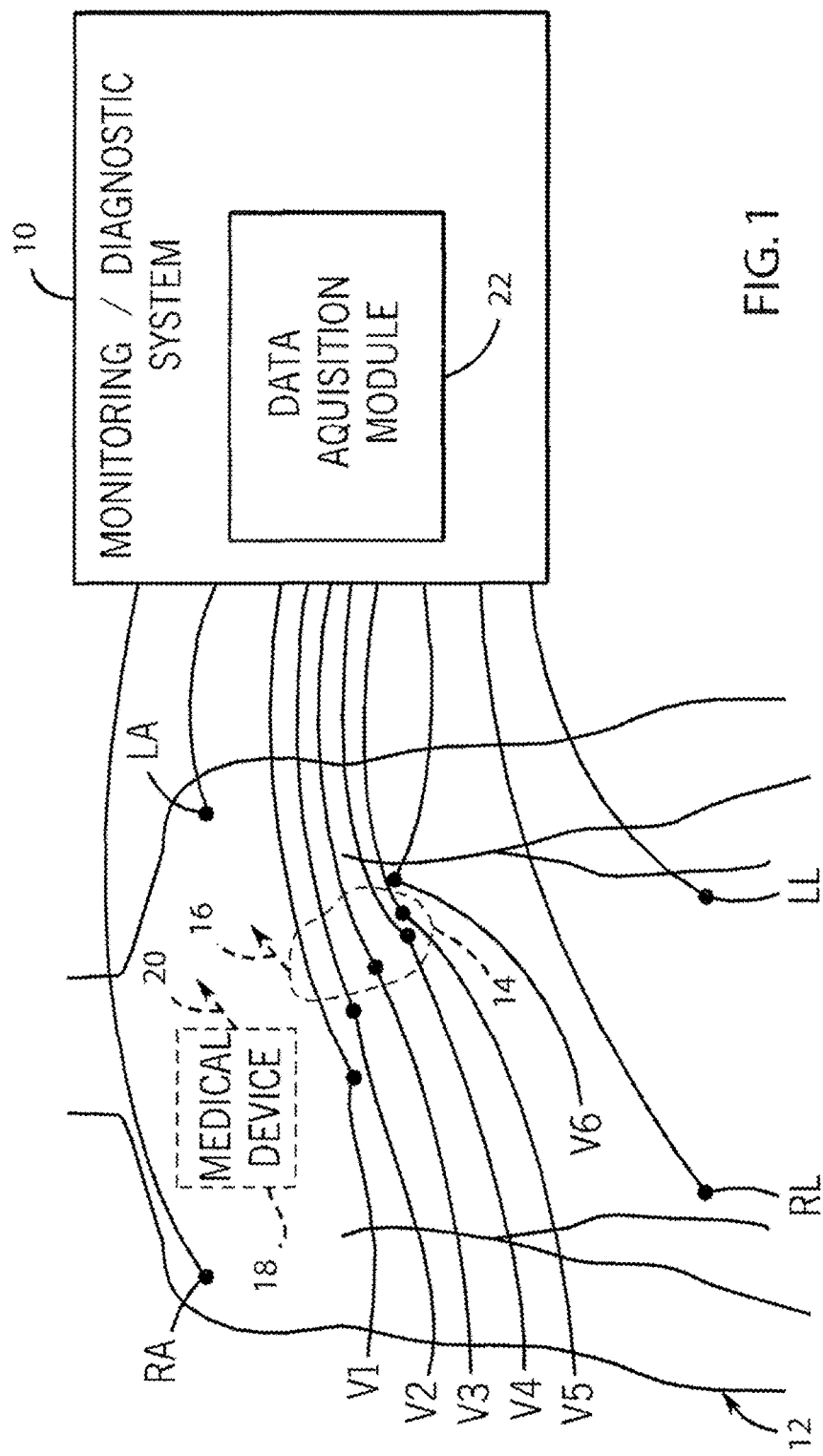
FIG. 1 depicts an embodiment of a diagnostic monitoring system connected to an electrode configuration suitable to collect a standard twelve-lead electrocardiograph.

Cardiac resynchronization therapy (CRT) relies upon a special type of pacemaker for the treatment of heart failure. Known as a bi-ventricular pacemaker, these electronic cardiac implants generate multiple artificial stimuli intended to optimize how uniformly the walls of the left ventricle contract and squeeze out blood, thus making the heart pump more effectively.

Unfortunately, artificial stimulation can fail for a number of reasons. One of them is called "lack of capture," meaning the implant can send an electrical impulse down a lead wire to the heart muscle but the muscle ends up not sufficiently stimulated to depolarize and contract. CRT is especially prone to lack of capture from the lead wire placed along the free wall of the left ventricle (LV). The reason the LV lead is more prone to failure to capture is because the right ventricle (RV) and LV leads are affixed to the heart using different methods. In the case of the RV, the lead is screwed or harpooned into the wall of the ventricle at the apex of the RV. However, in the case of the LV, the lead is not screwed into anything. Instead, the lead is simply placed in the venous return of the coronary circulation. Any clots formed due to the presence of the LV lead may thus be returned to the right atrium rather than traveling to the brain (as would occur if the LV were fixed to the wall of the LV). However, the tradeoff is that given the fragile nature of the coronary vein, the LV lead cannot be screwed or harpooned into the flesh of the heart and, thus, can be easily dislodged.

When the LV lead dislodges, the patient who may have been successfully treated for heart failure can suddenly end up with symptoms such as shortness of breath, extreme fatigue, and/or weakness, e.g., the very symptoms which led to the deployment of a CRT in the first place. Given the ominous change in the patient's symptoms, the patient typically does not contact the electrophysiologist who originally put in the bi-ventricular pacemaker but instead, immediately goes to the emergency department (ED). Unfortunately, the ED does not have the same equipment as an electrophysiologist does to diagnose failures due to the electronic implant itself or whether the artificial stimuli the electronic implant is generating are failing to capture. For example, to interrogate an electronic implant, a proprietary interrogating wand and programmer (e.g., workstation) are typically required, which may be specific to the particular manufacturer of the electronic implant. Without access to these pieces of equipment, care providers in an ED or other general medical care facility may not be able to determine the type of electronic implant present in a patient, let alone whether the implant is exhibiting a particular type of degradation. Thus, treating patients who present with heart-related symptoms may be time consuming and difficult, and may sometimes result in inappropriate initial diagnoses, potentially compromising patient care.

Thus, according to embodiments disclosed herein, indications that lack of capture may be occurring may be output without specialized implant programmers or other equipment, using only surface ECG signals. Without a pacemaker programmer, a potential or probable lack of capture during bi-ventricular pacing may be identified by confirming that a patient not only has an electronic implant capable of CRT (e.g., biventricular pacing) but that the electronic implant is firing multiple times during the QRS complex (e.g., confirming that biventricular pacing is occurring) and further confirming that the patient's QRS complex is wider or points in a different direction than the QRS that was apparent when the CRT implant was first deployed.

To detect whether biventricular pacing is occurring, a high frequency ECG system may be used, as the multiple artificial stimuli used to synchronize the squeezing motion of the left ventricle occur so close together they cannot be detected with a conventional electrocardiograph. Further, a serial comparison procedure may be carried out to evaluate changes in the patient's QRS morphology in the presence of bi-ventricular pacing. If the patient's QRS duration changes significantly, then the system will indicate the change and that the change may be related to how well the CRT implant is operating. In addition, if the QRS axis changes significantly, the system will indicate the change and that the change may be related to how well the CRT implant is operating.

Figure 2:
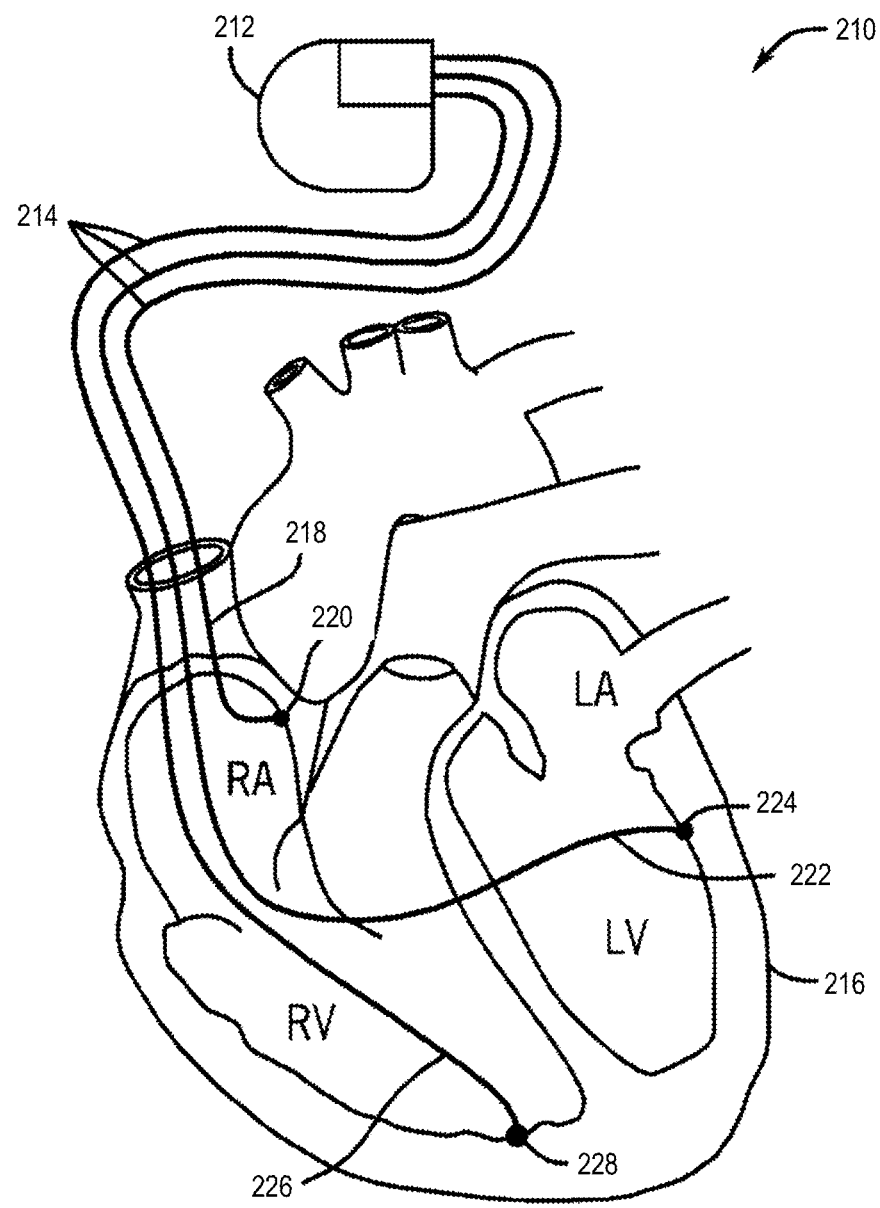
FIG. 2 depicts an embodiment of a pacing system.
Figure 3:
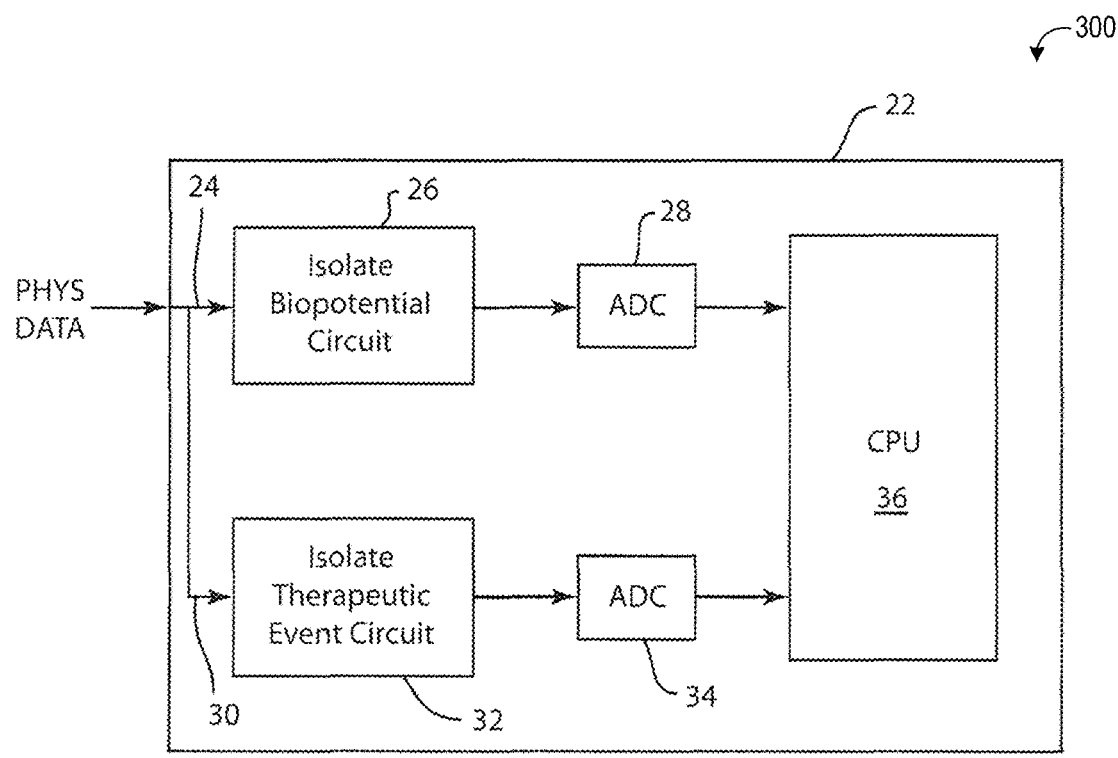
FIG. 3 depicts an embodiment of a data acquisition module.
Figure 4:
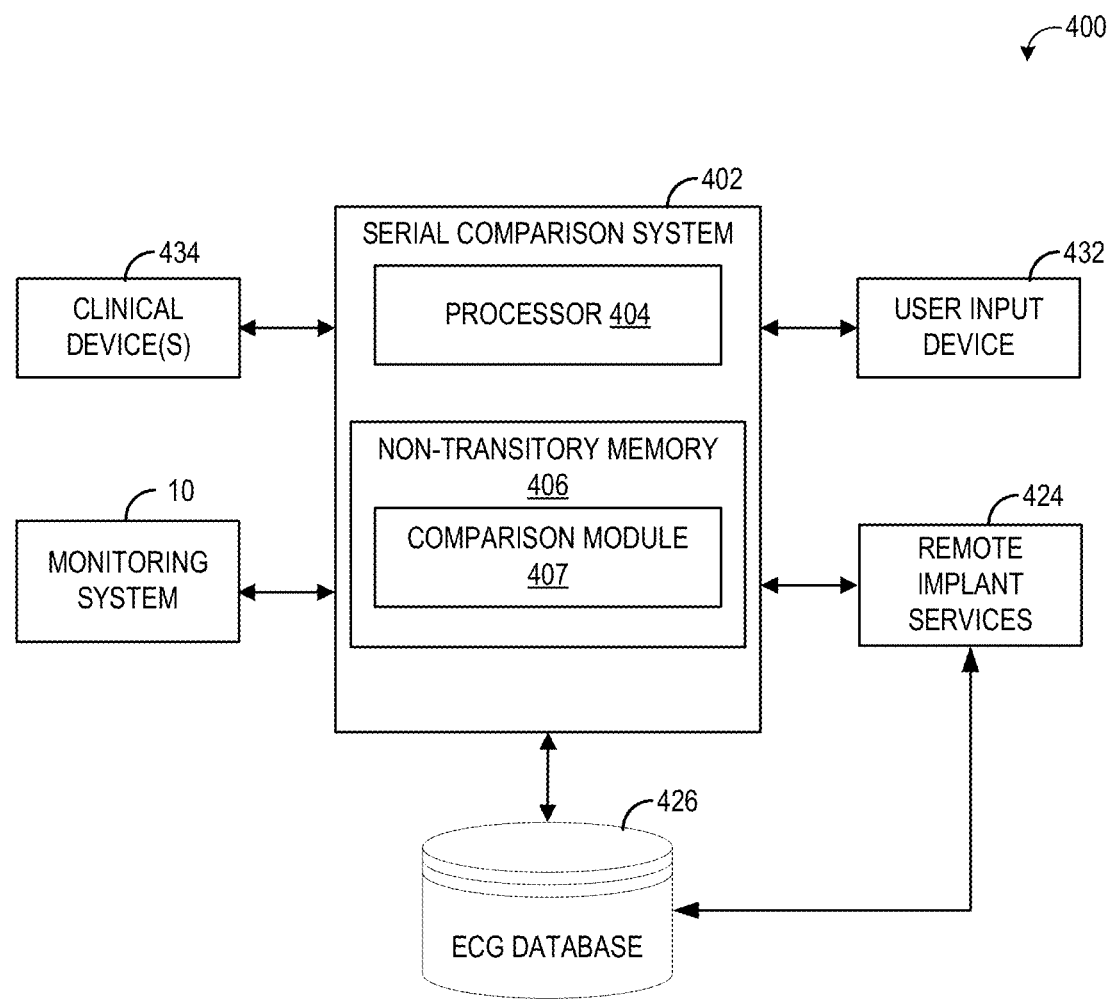
FIG. 4 is a block diagram schematically illustrating a serial comparison system according to an embodiment of the disclosure.

FIG. 1 shows an example monitoring system for monitoring a heart of a patient including an electronic implant with surface ECG signals obtained with electrodes coupled to a data acquisition module. FIG. 2 shows an example electronic implant in a patient. FIG. 3 shows a detailed block diagram of the data acquisition module, including components for identifying pacing signals (e.g., pacemaker pulses), such as the signals shown in FIG. 8, and biopotential signals in the surface ECG signals, such as the biopotential signals shown in FIG. 9 and FIG. 10. FIG. 4 shows an example ECG system configured to carry out a serial comparison of the pacing signals and biopotential signals in order to diagnose lack of capture, which may be executed according to the methods shown in FIGS. 5-7.

FIG. 1 depicts a monitoring system 10 that is connected to a patient 12. In alternative embodiments, the monitoring system 10 may also be a diagnostic system that aids the clinician in interpreting the physiological data. The monitoring system 10 is connected to the patient 12 via a plurality of electrodes (labeled RA, LA, RL, LL, V1, V2, V3, V4, V5 and V6). The electrodes are typically placed at standard anatomical locations as in accordance with the standard acquisition of a twelve-lead electrocardiogram (ECG). A twelve-lead ECG utilizes four limb electrodes (RA, LA, RL, LL) and six precordial electrodes (V1, V2, V3, V4, V5, and V6). Differential voltages are obtained between two or more of these electrodes to obtain leads or projections through the heart along which the electrical characteristics of the heart are measured. While a 12 lead ECG is shown herein, it is to be understood that the monitoring system 10 may include a suitable number of leads without departing from the scope of this disclosure, such as six leads.

The heart 14 of the patient 12 produces an electrical impulse 16 at regular intervals. The electrical impulse causes the muscle tissue of the heart to contract as the electrical impulse 16 propagates through the heart. The resulting electrical potential generated at the patient's skin due to the propagation of this electrical impulse through the heart muscle tissue is measured by each of the electrodes and represented by each of the ECG leads.

Often, when the heart tissue is damaged or diseased the heart improperly generates or propagates the electrical impulses and fails to properly contract. In this situation, an electronic implant 18, such as a pacemaker or defibrillator, is placed inside the body of the patient 12. The electronic implant 18 generates its own electrical impulses 20 to stimulate the tissue of the heart 14 such that the heart 14 properly contracts.

The electrodes placed on the patient 12 are electrical transducers, and as such pick up all electrical energy at the electrode location and provide the sensed electrical signals to the data acquisition module 22 of the monitoring system 10. Therefore, the data acquisition module 22 acquires not only the electrical heart impulses 16, but the electronic implant impulses 20 as well as electrical noise from any number of sources in and around the patient. The electrical noise may include electro-magnetic noise from man-made sources, electrical impulses from other medical devices used to provide care to the patient, and from other biopotentials generated by the patient such as muscle contractions (EMG) and/or brain waves (EEG).

The electrodes may be attached to the skin of the patient 12 in such a manner as to sense any biopotential signals produced by the heart 14 of the patient 12 and pacing signals produced by the electronic implant 18. Since the pacing signal is an electrical signal applied to the patient's heart, the electrodes will sense the pacing stimulus in conjunction with the biopotential signal produced by the heart. Thus, the combined signal sensed by the electrodes includes both the biopotential signal from the heart as well as the pacing signal from the electronic implant 18.

In the presently disclosed embodiment, the data acquisition module 22 may be included in an electrode monitor, also referred to herein as an ECG monitor, that receives the sensed combined signal and converts the signal from an analog signal into a digital signal. In embodiments, the data acquisition module/ECG monitor is a high bandwidth module, wherein the combined signal sensed by the electrodes is digitized at a high sampling rate in comparison to standard ECG monitoring techniques. Standard ECG monitoring techniques typically implement a digitizing sampling rate between 500 and 1000 Hz. In a high bandwidth data acquisition module/ECG monitor, the combined signal is sampled at a rate of 50 kHz or higher. The combined signal may be sampled at a rate between 50-75 kHz. Alternatively, the combined signal may be sampled at a rate higher than standard ECG monitoring techniques but at a rate below the disclosed high bandwidth ECG monitoring technique. These alternative sampling rates may be any sampling rate above 1 kHz and below 50 kHz. In some embodiments the high bandwidth of the combined signal provides increased signal data that facilitates the signal processing as described in further detail herein. Thus, the system shown in FIG. 1 includes a plurality of electrodes configured to measure electrical potential generated at a skin of a patient and an electrode monitor (e.g., an ECG monitor) configured to generate an electrocardiogram (ECG) signal (e.g., via the data acquisition module 22) from the electric potential measured by the plurality of electrodes.

FIG. 2 depicts an example of a pacing system 210 as it appears inside the body of a patient. Pacing system 210 is a non-limiting example of electronic implant 18 of FIG. 1. The pacing system 210 includes an implantable pacemaker 212. A plurality of pacer leads 214 extend from the pacemaker 212. The pacer leads 214 extend from the pacemaker 212 into the heart 216 of the patient. Each of the pacer leads 214 extends to a different portion of the heart 216 and terminates in a pacer electrode. The RA pacer lead 218 extends to the right atrium (RA) and terminates at an RA pacer electrode 220. The LV pacer lead 222 extends to the left ventricle (LV) and terminates in an LV pacer electrode 224. An RV pacer lead 226 extends to the right ventricle (RV) and terminates at the RV pacer electrode 228.

While these three pacer electrode placements have been herein described, it is understood that pacer electrodes may be positioned at alternative locations on the heart and a patient may be treated using one or more pacer electrodes in the pacing system 210 and need not use, or be limited to, an arrangement with the three pacer electrodes as described above.

The pacer electrodes (220, 224, 228) are attached to the myocardium (muscle tissue) of the heart using a fixation mechanism. In the case of the RA pacer electrode 220 and the RV pacer electrode 228, the fixation mechanism is often a screw-type device that secures the electrode and creates a favorable electrical connection between the pacer electrode and the myocardium. Alternatively, as is used commonly with the LV pacer electrode 224, the electrode is not attached to the myocardium per se, but rather the LV pacer lead 222 is placed in the coronary sinus vein and tension in the LV pacer lead 222, or other elastic properties of the LV pacer lead 222 holds the LV pacer electrode 224 in position. This may be used in an alternative to other fixation mechanisms so as to prevent damage to the tissue or blood vessel wherein the lead and electrode reside.

The pacemaker 212 monitors the electrical activity of the heart 216 and analyzes these biopotential signals in order to detect abnormalities in the morphology and/or timing in the biopotential signals from the heart. Based on the detected abnormalities, the pacemaker 212 can deliver electrical impulses through the pacer leads 214 to one or more of the pacer electrodes (220, 224, 228).

Another challenge facing the optimal performance of the pacing system 200 is that the interior of the patient's body presents a dynamic and hostile environment for foreign objects. The body, and especially the heart 216, is constantly moving and the body's immune system is designed to isolate and destroy any foreign objects, such as an implanted pacing system 210. Therefore, pacing system malfunctions due to damaged and/or incomplete electrical connections are common occurrences. Due to the dynamic conditions within the patient's body, the pacer leads 214 are constantly moving. Further, the body's immune system makes the insulation over the leads brittle over time. These two factors make the leads susceptible to lead fracture. The constant motion of the pacing system 200 further causes the pacer electrodes to be susceptible to micro and macro dislodgement when the fixation mechanism of the electrode pulls away from the heart tissue or is otherwise dislodged from electrical contact with the target physiological placement.

It is desirable to easily detect the existence of a pacing system malfunction, identify the cause of the malfunction, and remedy this cause in order to provide the patient with the proper pacing therapy. A non-limiting list of pacing system malfunctions includes lead fractures, insulation defects, micro dislodgements, macro dislodgements, battery depletion, and pacemaker hardware defects.

The above-listed malfunctions can manifest in a variety of changes exhibited in the morphology of a detected combined signal, comprising a biopotential signal and a pacer signal, collected from one or more surface electrodes (electrocardiogram (ECG)). A non-limiting list of such manifested pacing system complications include a failure to sense, a failure to capture, and an inappropriate rate. A failure to sense occurs when the pacemaker has failed to sense the response of the myocardium to the electrical pacing stimulus. A failure to capture occurs when the pacemaker fails to generate a stimulus impulse sufficient to stimulate the myocardium. An inappropriate rate is characterized by the pacemaker producing a stimulus impulse at too slowly or too quickly of a rate.

FIG. 3 depicts a more detailed embodiment of the data acquisition module 22. The data acquisition module 22 receives the physiological data from the electrodes and processes the physiological data along two data processing paths. The first data processing path 24 serves to isolate and process the ECG component of the raw physiological data. This biopotential signal is typically most important and/or clinically relevant data obtained in such a system. The biopotential signal (in this case ECG data) provides the most information regarding the patient's physiological condition and bodily function. The ECG data/biopotential signal may be isolated from the physiological data by an isolation biopotential circuit 26. As stated above, the frequency content of the ECG data (e.g., the biopotential signal) is typically between 0.5 Hz and 150 Hz, therefore, the isolation biopotential circuit 26 may include a low pass filter. Next, the isolated biopotential signal may be digitized using an analog-to-digital converter (ADC) 28. An exemplary sampling frequency for a biopotential signal may be 2 kHz; however, this is not intended to be limiting on the frequencies at which the ECG may be sampled. Finally, the digitized biopotential signal from the first data processing path 24 may be provided to a controller or CPU 36 for further data processing as explained herein.

The physiological data is also processed by the data acquisition module 22 along a second data processing path 30. The purpose of the second data processing path is to isolate and enhance the therapeutic event signal (e.g., pacing signal or pacemaker pulses) that, in the embodiment described herein, is provided by the electronic implant 18. This may be achieved by an isolation therapeutic event circuit 32. As explained above, the bandwidth of the therapeutic event signal may be much greater than that of the previously described biopotential signal. Therefore, the isolation therapeutic event circuit 32 may comprise a bandpass filter with a pass band between 250 Hz and 15 kHz; however, the aforementioned pass band is merely exemplary and is not intended to be limiting on the types of filtering or pass band that may be implemented in embodiments of the isolation therapeutic event circuit 32.

Next, the filtered therapeutic event signal may be digitized by ADC 34. As the therapeutic event signal may have a greater frequency content than the biopotential signal, ADC 34 may sample at a much higher frequency than ADC 28. As an exemplary sampling rate, the ADC 34 may sample at a rate of 75 kHz; however, this sampling rate is not intended to be limiting on the range of sampling rates that may be used by ADC 34. Finally, the digitized therapeutic event signal (e.g., the digitized pacing signal) is provided to CPU 36 for further processing as disclosed herein.

In an alternative embodiment of the data acquisition module 22, a single multiplexer (not depicted) may be utilized to sample each of the electrodes such that multiple sets of data processing paths are not needed. In embodiments not using a multiplexer, a first data processing path 24 and a second data processing path 30 may be needed for each physiological data lead. The use of a multiplexer may reduce implementation and component costs by eliminating the redundancy that would be required to process all of the physiological data simultaneously.

Referring to FIG. 4, an ECG system 400 including a serial comparison system 402 is shown, in accordance with an exemplary embodiment. In some embodiments, at least a portion of serial comparison system 402 is included in a device (e.g., edge device, server, etc.) communicably coupled to the monitoring system 10 via wired and/or wireless connections. In some embodiments, at least a portion of serial comparison system 402 is included in a separate device (e.g., a server), which can receive ECG data from the monitoring system 10 or from a storage device which stores the ECG data. Serial comparison system 402 may be operably/communicatively coupled to a user input device 432 and to one or more clinical devices 434.

Serial comparison system 402 includes a processor 404 configured to execute machine readable instructions stored in non-transitory memory 406. Processor 404 may be single core or multi-core, and the programs executed thereon may be configured for parallel or distributed processing. In some embodiments, the processor 404 may optionally include individual components that are distributed throughout two or more devices, which may be remotely located and/or configured for coordinated processing. In some embodiments, one or more aspects of the processor 404 may be virtualized and executed by remotely-accessible networked computing devices configured in a cloud computing configuration.

Non-transitory memory 406 may store a comparison module 407 configured to carry out a serial comparison procedure where a current ECG for a particular patient is received at the serial comparison system 402, which launches the serial comparison procedure. The comparison module 407 retrieves the record for a previous ECG for the particular patient (also referred to as a baseline ECG) stored in ECG database 426 and renders the previous ECG for comparison with the record for the current ECG for that same patient. Additional details about a serial comparison procedure for detecting lack of capture is presented below with respect to FIG. 7.

In some embodiments, the non-transitory memory 406 may include components included in two or more devices, which may be remotely located and/or configured for coordinated processing. In some embodiments, one or more aspects of the non-transitory memory 406 may include remotely-accessible networked storage devices configured in a cloud computing configuration.

User input device 432 may comprise one or more of a touchscreen, a keyboard, a mouse, a trackpad, a motion sensing camera, or other device configured to enable a user to interact with and manipulate data within serial comparison system 402. In some examples, the user input device 432 is included as part of monitoring system 10 and/or one or more clinical devices 434.

Serial comparison system 402 may be configured to send reports and/or other communication to monitoring system 10 and/or one or more clinical devices 434. The one or more clinical devices 434 may include a digital pager, a smartphone, a tablet computer, a laptop computer, a fax machine, a printer, a hospital information system for billing and clinical reports, a workstation, and/or other servers or computing devices on the network to which the serial comparison system 402 is connected. The one or more clinical devices 434 may include an interface for communicating with a user, such as a display device utilizing virtually any type of technology. In some embodiments, the display device may comprise a computer monitor, and may display ECG data and/or reports about the ECG data generated by the comparison module 407. In some embodiments, the serial comparison system 402 may include an interface for communicating with a user, such as a display device, such that ECG data and/or reports about the ECG data generated by the comparison module 407 may be communicated without an intervening device.

In some examples, the serial comparison system 402 and/or the ECG database 426 may be communicatively coupled to one or more remote implant services 424. The serial comparison system 402 and/or the ECG database 426 may be communicatively coupled to the one or more remote implant services 424 via a Health Level Seven International (HL7) interface (or another type of interface that enables a secure connection between clinical devices according to established standards) such that the serial comparison system 402 and/or the ECG database 426 may communicate with the one or more remote implant services 424 via the HL7 protocol. The one or more remote implant services 424 may be maintained by electronic implant manufacturers and/or electrophysiologist clinics and may include information regarding electronic implants (e.g., pacemakers) implanted in patients, such as when each implant was last configured and the implant configuration.

It should be understood that serial comparison system 402 shown in FIG. 4 is for illustration, not for limitation. Another appropriate serial comparison system may include more, fewer, or different components.

Figure 5:
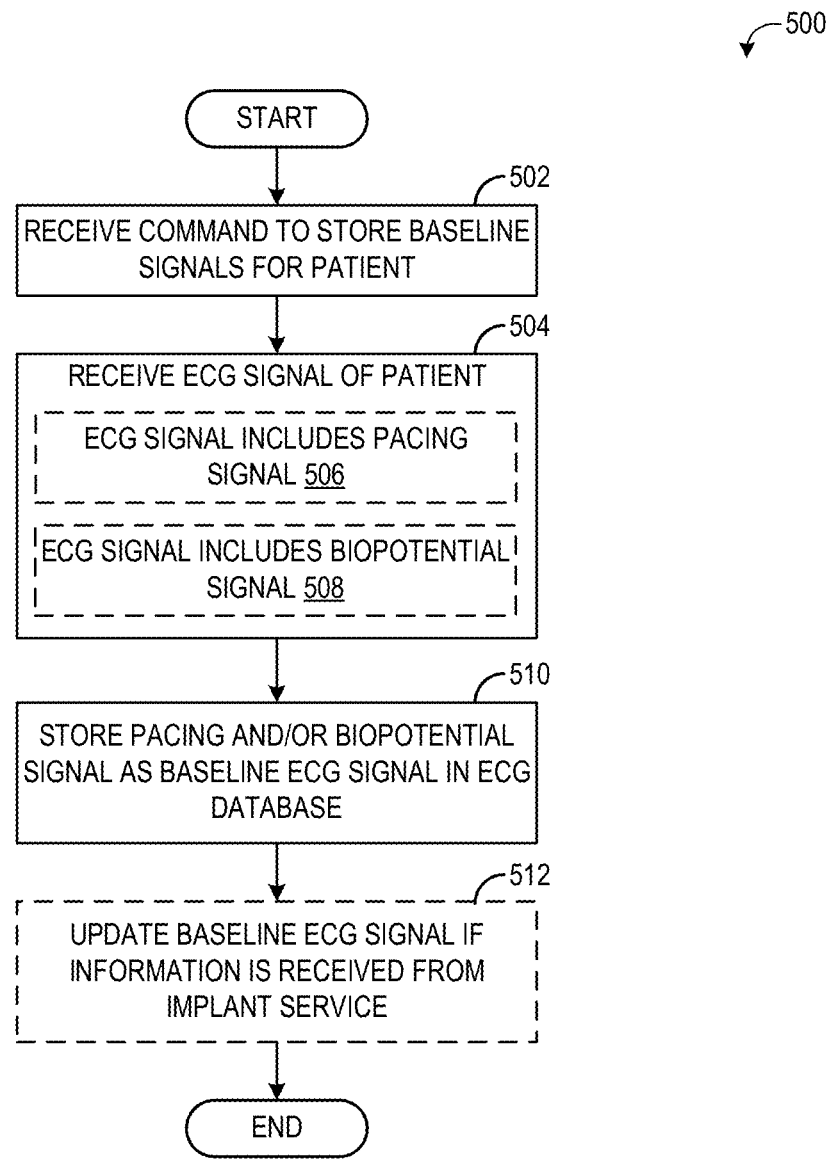
FIG. 5 is a flow chart illustrating a method for storing baseline ECG signals in an ECG database.

FIG. 5 is a flow chart illustrating an example method 500 for storing baseline ECG signals in an ECG database, according to an embodiment of the present disclosure. Method 500 is described with regard to the systems and components of FIGS. 1-4, though it should be appreciated that the method 500 may be implemented with other systems and components without departing from the scope of the present disclosure. Method 500 may be carried out according to instructions stored in non-transitory memory of a computing device, such as serial comparison system 402 of FIG. 4. While method 500 is described with respect to a single patient, it should be appreciated that method 500 may be carried out for each of a plurality of patients, such that a baseline ECG signal is stored in an ECG database for each patient for which an ECG signal is obtained.

At 502, a command is received to store one or more baseline ECG signals for a patient. The command may include a request sent from an electrocardiogram monitor, e.g., monitoring system 10, indicating that a baseline ECG signal for the patient has been acquired and will be sent to the serial comparison system for storage in the ECG database. In other examples, an explicit command may be omitted and the serial monitoring system may determine that a baseline ECG signal is to be stored when the ECG signal is received from the monitoring system 10. The baseline ECG signal may be the first ECG signal of the patient sent to the serial comparison system, in some examples. In other examples, the baseline ECG signal may be an updated ECG signal sent to the serial comparison system following placement of an electronic implant in the patient or reconfiguration of an existing electronic implant. In still further examples, the baseline ECG signal may be an updated ECG signal sent to the serial comparison system following a relatively long duration since a prior baseline ECG signal was saved for the patient, such as after six months or a year. In any of these examples, the baseline ECG signal may represent a baseline (e.g., normal or expected) function of the patient's heart and/or a baseline configuration of an electronic implant of the patient, to which future ECG signals of the patient may be compared.

At 504, an ECG signal of a patient is received. The ECG signal may include digitized ECG recordings from one or more leads of an ECG, such as 12 digitized ECG recordings obtained from a 12-lead ECG (such as from monitoring system 10). In some examples, the ECG signals may be digitized at a high sampling rate, such as 50 kHz or higher. In such examples, signals from one or more of the 12 leads may be processed as described above with respect to FIG. 3 (e.g., passed through a bandpass filter with a pass band between 250 Hz and 15 kHz and digitized at the high sampling rate) in order to isolate a pacing signal that may be indicative of the electrical impulses originating from an electronic implant (e.g., a pacemaker) present in the patient. Accordingly, the ECG signal that is received at 504 may include a pacing signal, as indicated at 506. Regardless of the type of ECG system used to obtain the ECG signal, the ECG signal received at 504 may include a biopotential signal, as indicated at 508. The biopotential signal may be indicative of the electrical impulses generated by the heart of the patient and may be isolated using a low-pass filter and digitized at a sampling rate of 2 kHz, at least in some examples. For example, the biopotential signal may be a typical ECG waveform that may comprise a P wave during depolarization of the atria, a QRS complex during depolarization of the ventricles, and a T wave during repolarization of the ventricles. This may result in five definable points within the waveform: P, Q, R, S, and T. Various ECG features may include different intervals detected within the biopotential signal via one or more ECG analytics algorithms (which may be applied during the serial comparison described below), such as a PR interval (e.g., measured from the beginning of the P wave to the beginning of the QRS complex), a RR interval (e.g., measured from a first R wave to a second R wave of a subsequent beat), a QT interval (e.g., measured from the beginning of the QRS complex to the end of the T wave), and so forth.

At 510, the pacing signal and/or the biopotential signal are stored as the baseline ECG signal for the patient in an ECG database, such as ECG database 426. The baseline ECG signal may therefore comprise a baseline biopotential signal (for each lead of the ECG monitor) and may optionally also comprise a baseline pacing signal (for each lead of the ECG monitor) when the ECG signal was captured with a high sampling rate ECG monitor. The baseline ECG signal may be tagged with patient identifying information (e.g., medical record ID) to facilitate retrieval of the baseline ECG signal at a later date if indicated, as will be explained in more detail below. Further, if any interpretation was performed on the baseline ECG signal (e.g., by the monitoring system 10), such as statements indicating abnormal findings, annotations of ECG complexes in the baseline ECG signal, etc., those statements or annotations may also be sent to the serial comparison system and saved in the ECG database along with the baseline ECG signal.

In some examples, as indicated at 512, the baseline ECG signal may be updated if information is received from an implant service, such as the one or more remote implant services 424. For example, the implant service may store a current configuration of the implant in the patient (e.g., whether the implant has been configured to carry out biventricular pacing or a different type of pacing, the number, spacing, and/or duration of the pacing pulses, etc.) and may send the current configuration of the implant in response to a request from the serial comparison system. In some examples, once communication between the serial comparison system and the implant service has been established for the patient, the implant service may push notifications about the patient to the serial comparison system, such as a notification indicating that the configuration of the patient's implant has been changed. In other examples, the serial comparison system may occasionally query the implant service to determine if any changes to the configuration of the patient's implant have been made. In examples where the configuration of the patient's implant has changed, the changes to the configuration may be stored along with the baseline ECG signal in the ECG database. Method 500 then returns.

Figure 6:
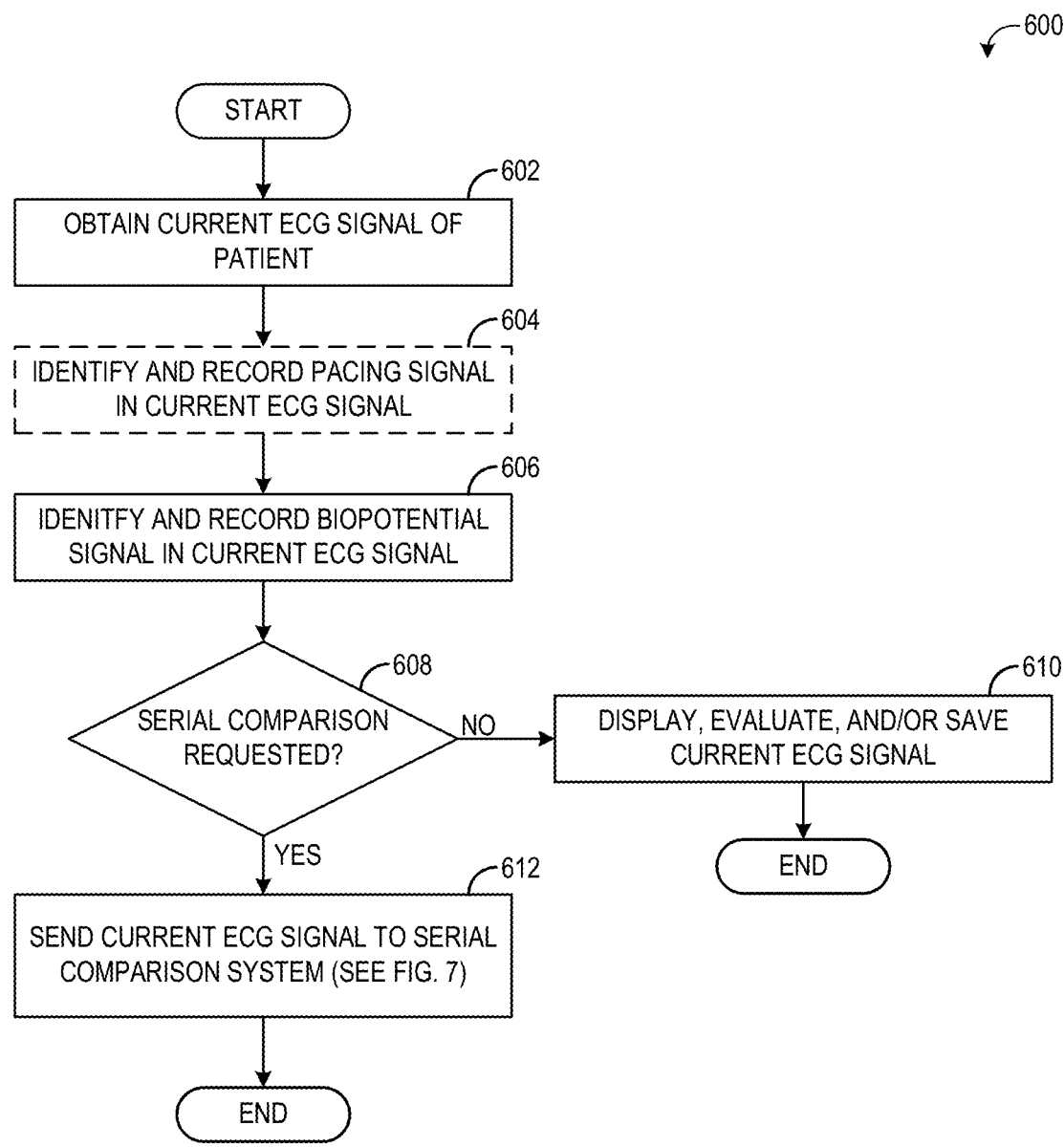
FIG. 6 is a flow chart illustrating a method for obtaining a current ECG signal of a patient.

FIG. 6 is a flow chart illustrating an example method 600 for obtaining a current ECG signal of a patient, according to an embodiment of the present disclosure. Method 600 is described with regard to the systems and components of FIGS. 1-4, though it should be appreciated that the method 600 may be implemented with other systems and components without departing from the scope of the present disclosure. Method 600 may be carried out according to instructions stored in non-transitory memory of an ECG monitor, such as monitoring system 10.

At 602, a current ECG signal of a patient is obtained. As explained above, the ECG signal may include digitized ECG recordings from one or more leads of an ECG, such as 12 digitized ECG recordings obtained from a 12-lead ECG (such as from the electrodes and electrode monitor of monitoring system 10). The ECG recordings may be digitized at a high sampling rate, at least in some examples. At 604, method 600 optionally includes identifying and recording a pacing signal in the current ECG signal, which may be carried out as explained above with respect to FIGS. 3 and 5. The pacing signal may be identified when the ECG signal is obtained with an ECG monitor capable of digitizing the signals at the high sampling rate. At 606, method 600 includes identifying and recording a biopotential signal in the current ECG signal, which may be carried out as explained above with respect to FIG. 5. In this way, the ECG signal may be processed to generate a biopotential signal that represents the electrical impulses of the heart of the patient as well as a pacing signal (when available) that represents the pulses of the implant in the patient.

At 608, method 600 determines if serial comparison of the current ECG signal is requested or indicated. Serial comparison may include a comparison between the current ECG signal of the patient (e.g., the pacing signal and/or biopotential signal) and one or more baseline ECG signals of the patient collected earlier in time in order to identify any changes from the baseline to the current ECG signal that may be indicative of patient and/or implant status. In some examples, the serial comparison may be performed in response to a request from a clinician (e.g., via a user input entered to the ECG monitor). In other examples, the serial comparison may be performed automatically, such as each time an ECG signal is obtained with the ECG monitor. If serial comparison is not requested, method 600 proceeds to 610 to display, evaluate, and/or save the current ECG signal, without comparing the current ECG signal to a prior baseline ECG signal. In some examples, the current ECG signal may be evaluated to determine if a possible lack of capture of an electronic implant is present, even when there is no baseline ECG available. For example, if the QRS duration is wide (e.g., wider than an average QRS duration) and the pacing signal indicates that there is an electronic implant carrying out biventricular pacing, lack of capture may be suspected but may not be confirmed at a level of confidence without a prior measurement of the QRS duration after the electronic implant was implanted. Method 600 then returns.

If serial comparison is requested, method 600 proceeds to 612 to send the current ECG signal to a serial comparison system for further evaluation, which will be explained in more detail below with respect to FIG. 7. The current ECG signal that is sent at 612 may include the pacing signal and the biopotential signal, and may further include patient identifying information (e.g., medical record ID). In some examples, any analysis of the current ECG signal performed by the ECG monitor may be sent along with the current ECG signal. Method 600 then ends.

Figure 7:
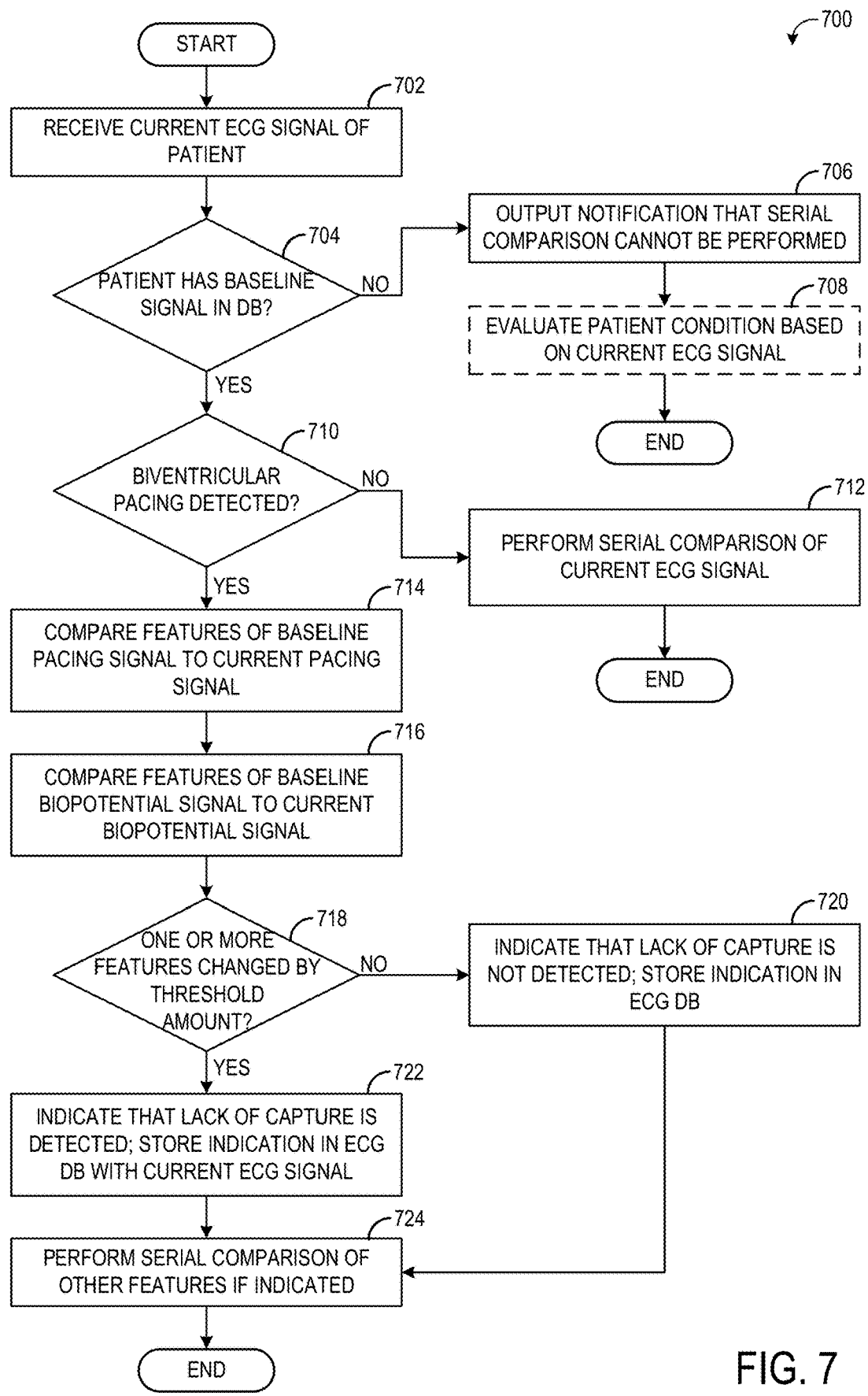
FIG. 7 is a flow chart illustrating a method for carrying out serial comparison of a current ECG signal relative to a baseline ECG signal to detect lack of capture.

FIG. 7 is a flow chart illustrating an example method 700 for performing serial comparison on a current ECG signal, according to an embodiment of the present disclosure. Method 700 is described with regard to the systems and components of FIGS. 1-4, though it should be appreciated that the method 700 may be implemented with other systems and components without departing from the scope of the present disclosure. Method 700 may be carried out according to instructions stored in non-transitory memory of a computing device, such as serial comparison system 402 of FIG. 4.

At 702, a current ECG signal of a patient is received, such as the ECG signal sent at 612 of FIG. 6. At 704, method 700 determines if the patient has a baseline ECG signal saved in an ECG database of the serial comparison system (or in communication with the serial comparison system), such as the baseline ECG signal obtained according to method 500 and/or a baseline ECG signal obtained via an implant service. As explained above, the current ECG signal may include a tag or header that includes patient identifying information, and the patient identifying information may be used to query the ECG database to determine if a baseline ECG signal for the patient is saved in the ECG database. If the patient does not have a baseline ECG signal stored in the ECG database (e.g., if the query does not return any baseline ECG signals associated with the patient saved in the ECG database), method 700 proceeds to 706 to output a notification that serial comparison could not be performed. The notification may be configured to be displayed on a display device, such as a display device associated with one of the clinical devices 434 of FIG. 4. In some examples, even when serial comparison cannot be performed, the serial comparison system may still be able to evaluate features in the current ECG signal (e.g., the width of the QRS complex) and compare the features to population averages or other known expected values to determine a potential patient condition, as indicated at 708. In some examples, when a baseline ECG signal is not stored in the ECG database for the patient, the current ECG signal may be stored as the baseline ECG signal. Method 700 then ends.

If the patient does have a baseline ECG signal saved in the ECG database, the baseline ECG signal is fetched from the ECG database and the baseline ECG signal is evaluated by the serial comparison system to determine if the patient has (or at least previously had) an electronic implant, and if so, determine the baseline pacing configuration for the implant. Determining the baseline pacing configuration may assist in narrowing down possible patient or implant conditions, which may speed up the process of identifying the most probable patient or implant condition(s) and may reduce the processing load placed on the serial comparison system by reducing the number of features of the biopotential and pacing signals that may be evaluated to determine the most probable patient or implant condition(s).

Specifically, the baseline ECG signal for the patient may be evaluated to determine if biventricular pacing is detected, as indicated at 710. Biventricular pacing may be detected by evaluating the pacing signal of the baseline ECG signal of the patient and/or based on any statements saved with the baseline ECG signal (e.g., the configuration of the implant as determined from the implant service). Biventricular pacing may be defined by at least two implant pulses being output per cardiac cycle (e.g., at least two pulses during the QRS complex), including a pulse to the right ventricle and a pulse to the left ventricle. Biventricular pacing may be identified by identifying the pacemaker pulses in the pacing signal of the baseline ECG signal and superimposing (or otherwise aligning) the pacemaker pulses to the biopotential signal of the baseline ECG signal to determine when (in the cardiac cycle) each pacemaker pulse is occurring. In some examples, the presence of an electronic implant and associated pacing configuration of the electronic implant may be determined by evaluating the current ECG signal (e.g., the current pacing signal) in addition to or alternative to evaluating the baseline pacing signal.

If biventricular pacing is not detected, method 700 proceeds to 712 to perform serial comparison of the current ECG signal to detect one or more patient/implant conditions. For example, the biopotential signal of the current ECG signal may be compared to the biopotential signal of the baseline ECG signal to determine if any changes in the ST segment elevation have occurred from the baseline to the current ECG signal and/or if a new Q wave is present in the current ECG signal, which may be signs of possible acute myocardial infarction. Further, in some examples, when biventricular pacing is not detected, a first number of features of the current biopotential signal may be compared to corresponding features of the baseline biopotential features. In some examples, the first number of features may be evaluated in a first order.

If at 710 biventricular pacing is detected, the serial comparison system may evaluate the baseline and current ECG signals in order to determine if the implant of the patient is potentially exhibiting lack of capture where the implant sends an electrical impulse down a lead wire to the heart muscle but the muscle ends up not sufficiently stimulated to depolarize and contract. In order to determine if the implant is potentially exhibiting lack of capture, method 700 includes, at 714, comparing one or more features of the baseline pacing signal to one or more corresponding features of the current pacing signal. The one or more features of the pacing signals that are evaluated may include the timing of the pacemaker pulses (e.g., the time between each pulse), the pulse duration of each pacemaker pulse, the shape of each pacemaker pulse, etc. Once an implant is installed and appropriately configured, the morphology of the pacemaker pulses and the timing between each pacemaker pulse should remain constant unless the implant is reconfigured by the implant installer. If one or more of the features has changed from the baseline pacing signal to the current pacing signal, the one or more changed features may be indicative of lack of capture, depending on which features have changed. For example, if a pacemaker pulse changes in duration or shape in the current pacing signal relative to the baseline pacing signal, the change of that pacemaker pulse may be indicative of lack of capture.

Additionally, the biopotential signals may be evaluated to determine if the implant is potentially exhibiting lack of capture. Thus, at 716, method 700 includes comparing one or more features of the baseline biopotential signal to one or more corresponding features of the current biopotential signal. The one or more features of the biopotential signals that are evaluated may be selected based on the determination that the implant was (or is intended to) carrying out biventricular pacing. The one or more features of the biopotential signals that are evaluated when biventricular pacing is detected may include a second number of features. The second number of features may be smaller than the first number of features that are evaluated when biventricular pacing is not detected and/or the second number of features may be evaluated in a different order than the first number of features.

The one or more features that are selected to be evaluated may include the morphology of the QRS complex, such as the duration and the axis of the QRS complex. If the QRS duration changes significantly (e.g., the duration of the QRS complex in the current biopotential signal is longer than the duration of the QRS complex in the baseline biopotential signal by a threshold amount or more, such as 10-25% longer or more), then the serial comparison system will indicate the change in the QRS duration and that the change may be related to how well the implant is operating. In addition, if the QRS axis changes significantly (e.g., switches from normal to left axis deviation), the serial comparison system will indicate the change in the QRS axis and that the change may be related to how well the implant is operating. In some examples, the T axis may be evaluated in addition to the morphology of the QRS complex. In some examples, the QRS duration and QRS axis may be evaluated before any other features are evaluated, when biventricular pacing is detected, which may be in contrast to when biventricular pacing is not detected (e.g., where one or more other features may be evaluated before the QRS duration and QRS axis are evaluated).

At 718, method 700 includes determining if one or more of the features has changed by at least a threshold amount, where the one or more features include one or more features of the current pacing signal and/or one or more features of the current biopotential signal, as explained above. If none of the evaluated features has changed by at least the threshold amount, method 700 proceeds to 720 to indicate that lack of capture is not detected and store the indication in the ECG database.

If at least one of the features has changed by a threshold amount (e.g., if the QRS duration has increased by at least 10%, or at least 25%, relative to the QRS duration in the baseline biopotential signal), method 700 proceeds to 722 to indicate that probable lack of capture is detected and store the indication in the ECG database (along with the current ECG signal). Further, in some examples, the indication may be communicated to a user through an interface (e.g., a display device of the serial comparison system or a clinical device), which may be performed once a final report is generated (as explained below) and/or once the probable lack of capture is detected. At 724, serial comparison of other features in the current ECG signal may be performed, if indicated. For example, other biopotential features/complexes may be evaluated to determine if any other changes are present in the current ECG signal relative to the baseline ECG signal. In some examples, if at least one feature has changed in a manner indicative of lack of capture, the additional features that are evaluated may be different than when lack of capture is not indicated, for example fewer additional features may be evaluated. In some examples, if a probable lack of capture is detected, a final report may be generated that indicates a probable lack of capture is detected, and no further analysis of the ECG signals may be performed, which may expedite the notification of the probable lack of capture and reduce any further delays in diagnosing and treating the patient.

Once all serial comparisons have been performed, a final report may be generated. When a report for the patient is generated by the serial comparison system after all indicated features of the current ECG signal have been evaluated, the report may indicate that lack of capture was or was not detected (based on whether or not the one or more features had changed as determined at 718) and the report may be sent to a clinical device where the report may be output for display, saved in an electronic medical record database, etc.

Thus, method 700 may integrate a lack of capture analysis into a serial comparison procedure where multiple features of a current biopotential signal of a patient are compared to corresponding features of a baseline biopotential signal of the patient acquired at an earlier point in time. By evaluating for the presence or absence of lack of capture using serial comparison, patients who have wider than normal QRS durations at the time of implant installation (when the heart is paced as intended) may not be indicated as possibly exhibiting lack of capture, which may avoid false negative diagnoses. Further, the determination of whether or not biventricular pacing is occurring and whether or not probable lack of capture is detected may result in cascading changes to later evaluations performed as part of the serial comparison, in order to reduce the number of features that are evaluated and reduce the overall amount of time the evaluation requires, thereby improving patient outcomes. For example, if biventricular pacing is detected in the current pacing signal of a patient, other evaluations that may be performed to diagnose other implant issues (such as implant power issues, lead degradation, issues only occurring when single-chamber pacing implants are used, etc.) may be omitted to expedite the serial comparison procedure. Further, when biventricular pacing is detected and changes in a patient's QRS morphology indicative of probable lack of capture (e.g., a wide QRS complex) are detected via the serial comparison with a baseline ECG signal of the patient, the confidence that the patient may be exhibiting lack of capture may be higher than when the patient's QRS complex is identified as being wider than average but the patient does not have a baseline ECG signal for comparison. Thus, the final report generated via the serial comparison disclosed herein may indicate a higher level of confidence in probable lack of capture when a baseline ECG signal is used for comparison than when an analysis of only the current ECG signal is performed.

Further, while method 700 has been described herein as first identifying whether or not the patient's implant is carrying out biventricular pacing and then evaluating for features in the biopotential signals indicative of lack of capture, the features in the biopotential signals may be evaluated first. If lack of capture is possible condition (e.g., due to a wide QRS complex), lack of capture may be confirmed (or indicated at a higher level of confidence) by confirming that the patient's implant is carrying out biventricular pacing. Conversely, if a wide QRS complex is detected, lack of capture may be ruled out by confirming that the patient does not have an implant or that the patient's implant is not configured to carry out biventricular pacing.

Figure 8:
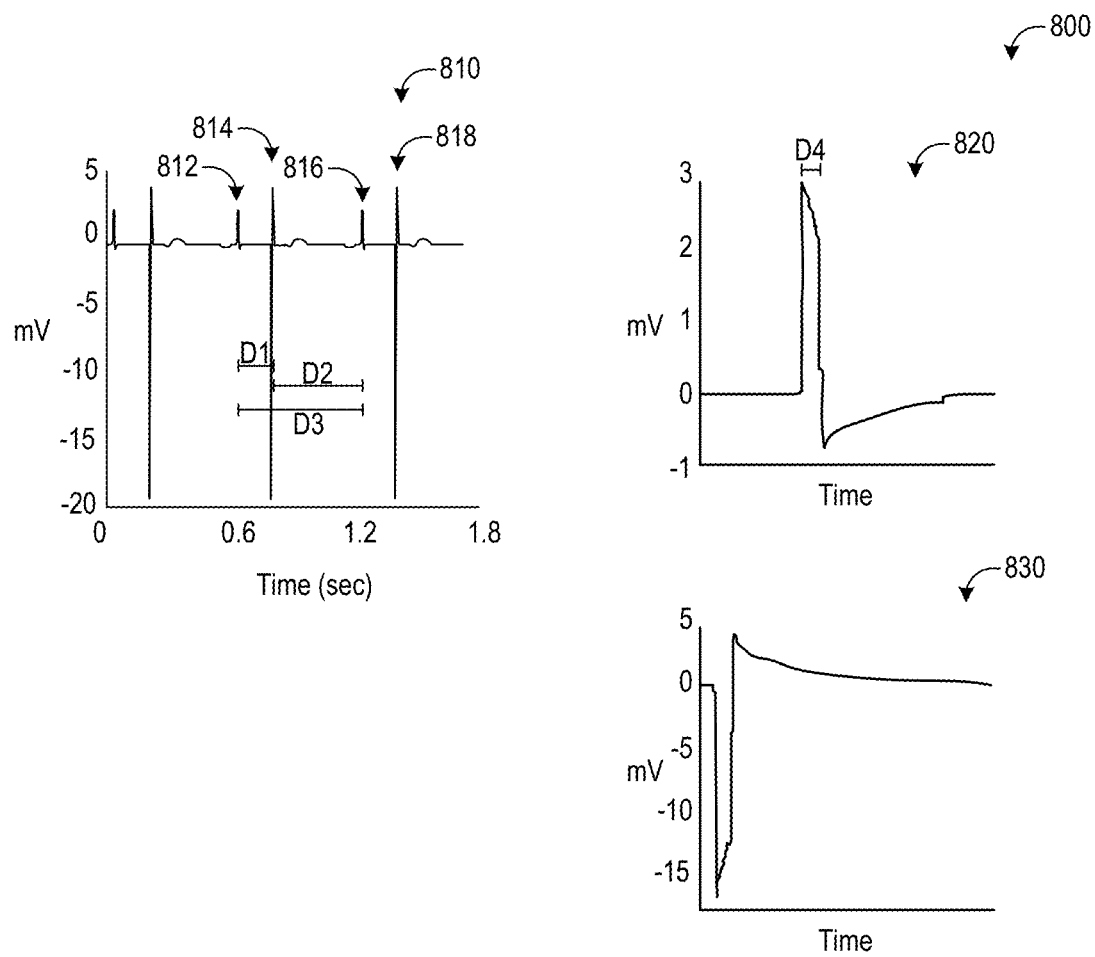
FIG. 8 shows an example pacing signal that may be evaluated to detect biventricular pacing.
Figure 9:
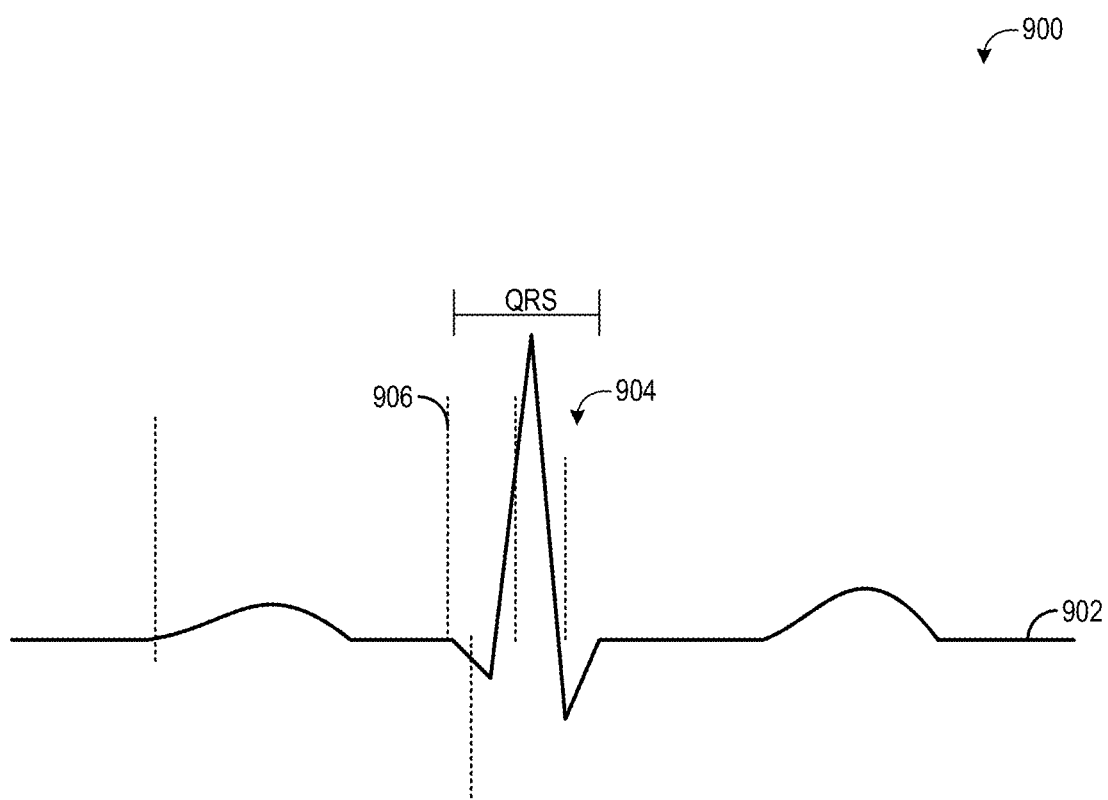
FIG. 9 shows an example combined pacing signal and biopotential signal.
Figure 10:
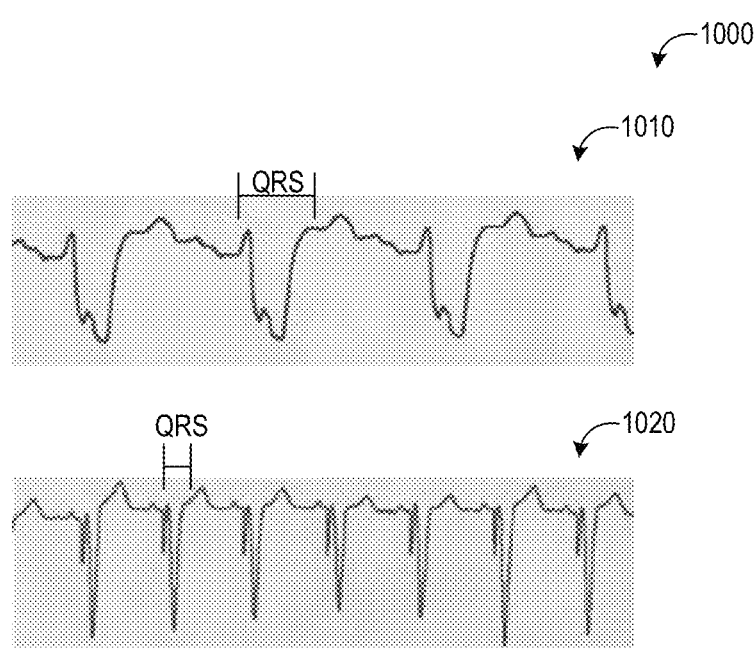
FIG. 10 shows a set of biopotential signals that may be evaluated to detect lack of capture.

FIGS. 8-10 illustrate examples of ECG signal features that may be evaluated by the serial comparison system to determine if lack of capture is present. FIG. 8 shows examples of pacing signals 800 that may be extracted from a baseline ECG signal, for example. The pacing signals 800 include a first pacing signal 810, showing sensed voltage as a function of time. The first pacing signal 810 may represent the isolated and digitized pacing signal obtained from one lead of an ECG. The first pacing signal 810 includes multiple pacemaker pulses, including a first pulse 812, a second pulse 814, a third pulse 816, and a fourth pulse 818. Each pacemaker pulse may be identified based on amplitude and timing relative to events in the corresponding biopotential signal (as explained below with respect to FIG. 9). For example, the first pulse 812 and the third pulse 816 may be identified as atrial pulses while the second pulse 814 and the fourth pulse 818 may be identified as right ventricular pulses.

The pacing signals 800 further include a first magnified view 820 of the first pulse 812 and a second magnified view 830 of the second pulse 814, each of which show voltage as a function of time. The time scale for each of the first magnified view 820 and the second magnified view 830 may be shorter than the time scale of the first pacing signal 810, such as a duration of 7 msec as opposed to a duration of 1.8 seconds for the first pacing signal 810.

Various features may be identified in the first pacing signal 810 that may be used to determine the pacing configuration of the implant and compared to future ECG signals. For example, a first duration D1 may be determined between the first pulse 812 and the second pulse 814, a second duration D2 may be determined between the second pulse 814 and the third pulse 816, a third duration D3 may be determined between the first pulse 812 and the third pulse 816, etc. Further, the pulse duration of each pulse may be determined, such as pulse duration D4 shown for the first pulse 812, the shape of each pulse (e.g., tilt angle/duration, discharge/recharge durations and shapes, etc.), pulse amplitude, and/or other features.

FIG. 9 schematically shows an example of a combined ECG signal 900, including detected pacemaker pulses 904 superimposed on an example biopotential signal 902. The biopotential signal may be isolated and digitized as explained above, and may represent a biopotential signal from one lead of an ECG. The pacemaker pulses 904 are shown by the dotted lines, such as line 906, with the amplitude and direction of the dotted lines indicating the approximate amplitude and polarity of the voltage signals for each pulse. Each pulse may be positioned on the biopotential signal 902 to show when, relative to the biopotential signal, each pulse occurred. Further, the biopotential signal 902 may be analyzed to identify various features, such as a duration of a QRS complex which begins at the start of the Q wave, spans the R wave, and terminates at the end of the S wave.

FIG. 10 shows an example set of biopotential signals 1000 that may be evaluated by the serial comparison system, according to method 700 discussed above. The set of biopotential signals 1000 includes a current biopotential signal 1010 and a baseline biopotential signal 1020, shown for a similar duration of time (e.g., on the same time scale).

Various features of the current biopotential signal 1010 may be compared to corresponding features of the baseline biopotential signal 1020 in order to determine if an implant in a patient is exhibiting lack of capture. For example, the QRS complexes may be identified in each biopotential signal and the duration of the QRS complex(es) in the current biopotential signal 1010 compared to the duration of the QRS complex(es) in the baseline biopotential signal 1020. As shown in FIG. 10, the duration of the QRS complex in the current biopotential signal 1010 is significantly longer (e.g., at least 25% longer) than the duration of the QRS complex in the baseline biopotential signal 1020. The increase in the duration of the QRS complex may indicate lack of capture, while a change in the other direction (e.g., a decrease in the QRS complex duration) may not indicate lack of capture. Because wide QRS complexes may indicate other potential issues besides lack of capture (e.g., bundle branch block, hyperkalemia, and other issues), the identification of a wide QRS complex in combination with knowledge that the patient has an implant configured to carry out biventricular pacing may assist the serial comparison system in suggesting a lack of capture of the implant as a potential patient/implant condition.

Thus, the serial comparison system disclosed herein may store a record of a surface ECG of a patient when an implant (e.g., an implant configured to provide CRT) was first deployed or whenever the implant is reprogrammed. This record can act as a signature of what is the proper function of the implant—including the number of stimuli and the time intervals between the stimuli—as well as what the QRS looks like when all the stimuli are properly captured. The stored ECG may be obtained with an ECG monitor at a medical facility and/or a specific ECG record may be obtained from the pacemaker lab (e.g., implant service) when the implant is deployed or reconfigured. The ECG record from the pacemaker lab may be labeled as such so the serial comparison system can refer back to the ECG record for comparison.

The technical effect of detecting lack of capture using serial comparison is that implant degradation/malfunction (and in particular lack of capture) may be differentiated from other implant or patient conditions using only surface ECG recordings and without requiring patient or clinician knowledge of the implant or pacing configuration, which may expedite diagnosis and patient care and may reduce a processing burden on a computing device carrying out the serial comparison by reducing the number of features of the surface ECG signal that need to be evaluated.

The disclosure also provides support for a system, comprising: a plurality of electrodes configured to measure electrical potential generated at a skin of a patient, an electrode monitor configured to generate an electrocardiogram (ECG) signal from the electric potential measured by the plurality of electrodes, an interface for communicating with a user, a memory storing instructions, and at least one processor configured to execute the stored instructions to: obtain a baseline ECG signal of a patient, obtain a current ECG signal of the patient from the electrode monitor, determine, based on the baseline ECG signal and/or the current ECG signal, that the patient has an electronic implant carrying out biventricular pacing, compare based on a determination that the electronic implant is carrying out biventricular pacing, the baseline ECG signal to the current ECG signal of the patient, and indicate, though the interface, a degradation condition of the electronic implant based on the comparing and the determination that the electronic implant is carrying out biventricular pacing. In a first example of the system, the obtaining the baseline ECG signal comprises fetching the baseline ECG signal from a database, and wherein the current ECG signal is acquired after the baseline ECG signal. In a second example of the system, optionally including the first example, the baseline ECG signal includes a baseline pacing signal and a baseline biopotential signal, and wherein the determining that the patient has an electronic implant carrying out biventricular pacing comprises determining that the patient has an electronic implant carrying out biventricular pacing based on the baseline pacing signal. In a third example of the system, optionally including one or both of the first and second examples, the current ECG signal includes a current pacing signal and a current biopotential signal, and wherein the determining that the patient has an electronic implant carrying out biventricular pacing comprises determining that the patient has an electronic implant carrying out biventricular pacing based on the current pacing signal. In a fourth example of the system, optionally including one or more or each of the first through third examples, the comparing the baseline ECG signal to the current ECG signal of the patient includes identifying a baseline QRS duration in the baseline ECG signal, identifying a current QRS duration in the current ECG signal, and comparing the current QRS duration to the baseline QRS duration. In a fifth example of the system, optionally including one or more or each of the first through fourth examples, the indicating the degradation condition comprises indicating the degradation condition in response to the current QRS duration being longer than the baseline QRS duration by at least a threshold amount. In a sixth example of the system, optionally including one or more or each of the first through fifth examples, the comparing the baseline ECG signal to the current ECG signal of the patient includes identifying a baseline QRS axis in the baseline ECG signal, identifying a current QRS axis in the current ECG signal, and comparing the current QRS axis to the baseline QRS axis. In a seventh example of the system, optionally including one or more or each of the first through sixth examples, the indicating the degradation condition comprises indicating the degradation condition in response to the current QRS axis being different than the baseline QRS axis by at least a threshold amount. In an eighth example of the system, optionally including one or more or each of the first through seventh examples, the indicating the degradation condition comprises indicating the electronic implant is exhibiting a probable lack of capture.

The disclosure also provides support for a serial comparison system, comprising: non-transitory memory storing instructions, and a processor, wherein the processor, when executing the instructions, is configured to: obtain a current ECG signal of a patient, fetch a baseline ECG signal of the patient from a database, determine, based on a pacing signal extracted from the baseline ECG signal or the current ECG signal, that the patient has a pacemaker carrying out biventricular pacing, compare one or more biopotential features of the baseline ECG signal to one or more corresponding biopotential features of the current ECG signal, the one or more biopotential features selected based on the determination that the pacemaker is carrying out biventricular pacing, indicate whether or not the pacemaker is exhibiting a probable lack of capture condition based on the comparing. In a first example of the system, the one or more biopotential features includes a QRS duration and/or a QRS axis. In a second example of the system, optionally including the first example, indicating that the pacemaker is exhibiting the probable lack of capture condition based on the comparing comprises indicating that the pacemaker is exhibiting the probable lack of capture condition based on the QRS duration and/or the QRS axis of the current ECG signal differing from a respective QRS duration and/or QRS axis of the baseline ECG signal by at least a threshold amount. In a third example of the system, optionally including one or both of the first and second examples, the processor, when executing the instructions, is further configured to, if the patient does not have a pacemaker carrying out biventricular pacing, compare the baseline ECG signal to the current ECG signal by comparing the one or more biopotential features of the baseline ECG signal to the one or more corresponding biopotential current ECG signal and/or by comparing one or more different biopotential features of the baseline ECG signal to one or more corresponding biopotential features of the current ECG signal. In a fourth example of the system, optionally including one or more or each of the first through third examples, the processor, when executing the instructions, is further configured to, determine, based on the pacing signal extracted from the baseline ECG signal or the current ECG signal, that the patient has a pacemaker but the pacemaker is not carrying out biventricular pacing and indicate whether or not the patient or the pacemaker has one or more other conditions and not indicate whether or not the pacemaker is exhibiting lack of capture.

The disclosure also provides support for a method, comprising: obtaining a baseline electrocardiogram (ECG) signal of a patient, obtaining a current ECG signal of the patient, determining, based on the baseline ECG signal and/or the current ECG signal, that the patient has an electronic implant carrying out biventricular pacing, comparing the baseline ECG signal to the current ECG signal of the patient, and indicating a degradation condition of the electronic implant based on the comparing and the determination that the electronic implant is carrying out biventricular pacing. In a first example of the method, the current ECG signal includes a current pacing signal and a current biopotential signal, the baseline ECG signal is obtained from a database and includes a baseline pacing signal and a baseline biopotential signal, comparing the current ECG signal to the baseline ECG signal comprises comparing the current pacing signal to the baseline pacing signal and comparing the current biopotential signal to the baseline biopotential signal, and indicating the degradation condition of the electronic implant of the patient based on the comparing and the determination that the electronic implant is carrying out biventricular pacing comprises indicating the degradation condition of the electronic implant of the patient based on each of the comparing and the determination that the electronic implant is carrying out biventricular pacing. In a second example of the method, optionally including the first example, indicating the degradation condition of the electronic implant based on each of the comparing comprises: identifying that the electronic implant is configured to carry out biventricular pacing based on the comparing of the current pacing signal to the baseline pacing signal, identifying a change of one or more features in the current biopotential signal relative to one or more corresponding respective features in the baseline biopotential signal, and indicating the degradation condition of the electronic implant based on identifying that the electronic implant is configured to carry out biventricular pacing and based on identifying the change of the one or more features in the current biopotential signal. In a third example of the method, optionally including one or both of the first and second examples, the one or more features in the current biopotential signal comprises one or more of a QRS duration and a QRS axis. In a fourth example of the method, optionally including one or more or each of the first through third examples, identifying the change of one or more features in the current biopotential signal relative to one or more corresponding respective features in the baseline biopotential signal comprises identifying an increase in the QRS duration in the current biopotential signal relative to the QRS duration of the baseline biopotential signal. In a fifth example of the method, optionally including one or more or each of the first through fourth examples, indicating the degradation condition of the electronic implant comprises indicating a probable lack of capture of the electronic implant.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A system, comprising:
a plurality of electrodes configured to measure electrical potential generated at a skin of a patient;
an electrode monitor configured to generate an electrocardiogram (ECG) signal from the electric potential measured by the plurality of electrodes;
an interface for communicating with a user;
a memory storing instructions;
at least one processor configured to execute the stored instructions to:
obtain a baseline ECG signal of the patient;
obtain a current ECG signal of the patient from the electrode monitor;
determine, based on the baseline ECG signal and/or the current ECG signal, that the patient has an electronic implant carrying out biventricular pacing;
compare, based on a determination that the electronic implant is carrying out biventricular pacing, the baseline ECG signal to the current ECG signal of the patient; and
indicate, through the interface, a degradation condition of the electronic implant based on the comparing and the determination that the electronic implant is carrying out biventricular pacing.

2. The system of claim 1, wherein the obtaining the baseline ECG signal comprises fetching the baseline ECG signal from a database, and wherein the current ECG signal is acquired after the baseline ECG signal.

3. The system of claim 1, wherein the baseline ECG signal includes a baseline pacing signal and a baseline biopotential signal, and wherein the determining that the patient has an electronic implant carrying out biventricular pacing comprises determining that the patient has an electronic implant carrying out biventricular pacing based on the baseline pacing signal.

4. The system of claim 1, wherein the current ECG signal includes a current pacing signal and a current biopotential signal, and wherein the determining that the patient has an electronic implant carrying out biventricular pacing comprises determining that the patient has an electronic implant carrying out biventricular pacing based on the current pacing signal.

5. The system of claim 1, wherein the comparing the baseline ECG signal to the current ECG signal of the patient includes identifying a baseline QRS duration in the baseline ECG signal, identifying a current QRS duration in the current ECG signal, and comparing the current QRS duration to the baseline QRS duration.

6. The system of claim 5, wherein the indicating the degradation condition comprises indicating the degradation condition in response to the current QRS duration being longer than the baseline QRS duration by at least a threshold amount.

7. The system of claim 1, wherein the comparing the baseline ECG signal to the current ECG signal of the patient includes identifying a baseline QRS axis in the baseline ECG signal, identifying a current QRS axis in the current ECG signal, and comparing the current QRS axis to the baseline QRS axis.

8. The system of claim 7, wherein the indicating the degradation condition comprises indicating the degradation condition in response to the current QRS axis being different than the baseline QRS axis by at least a threshold amount.

9. The system of claim 1, wherein the indicating the degradation condition comprises indicating the electronic implant is exhibiting a probable lack of capture.

10. A serial comparison system, comprising:
non-transitory memory storing instructions; and
a processor, wherein the processor, when executing the instructions, is configured to:
obtain a current ECG signal of a patient;
fetch a baseline ECG signal of the patient from a database;
determine, based on a pacing signal extracted from the baseline ECG signal or the current ECG signal, that the patient has a pacemaker carrying out biventricular pacing;
compare one or more biopotential features of the baseline ECG signal to one or more corresponding biopotential features of the current ECG signal, the one or more biopotential features selected based on the determination that the pacemaker is carrying out biventricular pacing;
indicate whether or not the pacemaker is exhibiting a probable lack of capture condition based on the comparing.

11. The system of claim 10, wherein the one or more biopotential features includes a QRS duration and/or a QRS axis.

12. The system of claim 11, wherein indicating that the pacemaker is exhibiting the probable lack of capture condition based on the comparing comprises indicating that the pacemaker is exhibiting the probable lack of capture condition based on the QRS duration and/or the QRS axis of the current ECG signal differing from a respective QRS duration and/or QRS axis of the baseline ECG signal by at least a threshold amount.

13. The system of claim 10, wherein the processor, when executing the instructions, is further configured to, if the patient does not have a pacemaker carrying out biventricular pacing, compare the baseline ECG signal to the current ECG signal by comparing the one or more biopotential features of the baseline ECG signal to the one or more corresponding biopotential features of the current ECG signal and/or by comparing one or more different biopotential features of the baseline ECG signal to one or more corresponding biopotential features of the current ECG signal.

14. The system of claim 13, wherein the processor, when executing the instructions, is further configured to, determine, based on the pacing signal extracted from the baseline ECG signal or the current ECG signal, that the patient has a pacemaker but the pacemaker is not carrying out biventricular pacing and indicate whether or not the patient or the pacemaker has one or more other conditions and not indicate whether or not the pacemaker is exhibiting lack of capture.

15. A method, comprising:
obtaining a current ECG signal of a patient;
obtaining a baseline ECG signal of the patient;
determining, based on the baseline ECG signal and/or the current ECG signal, that the patient has an electronic implant carrying out biventricular pacing;
comparing the current ECG signal to the baseline ECG signal; and
indicating a degradation condition of an electronic implant of the patient based on the comparing and the determination that the electronic implant is carrying out biventricular pacing.

16. The method of claim 15, wherein the current ECG signal includes a current pacing signal and a current biopotential signal, wherein the baseline ECG signal is obtained from a database and includes a baseline pacing signal and a baseline biopotential signal, wherein comparing the current ECG signal to the baseline ECG signal comprises comparing the current pacing signal to the baseline pacing signal and comparing the current biopotential signal to the baseline biopotential signal, and wherein indicating the degradation condition of the electronic implant of the patient based on the comparing and the determination that the electronic implant is carrying out biventricular pacing comprises indicating the degradation condition of the electronic implant of the patient based on each of the comparing and the determination that the electronic implant is carrying out biventricular pacing.

17. The method of claim 16, wherein indicating the degradation condition of the electronic implant based on each of the comparing comprises:
identifying that the electronic implant is configured to carry out biventricular pacing based on the comparing of the current pacing signal to the baseline pacing signal;
identifying a change of one or more features in the current biopotential signal relative to one or more corresponding respective features in the baseline biopotential signal; and
indicating the degradation condition of the electronic implant based on identifying that the electronic implant is configured to carry out biventricular pacing and based on identifying the change of the one or more features in the current biopotential signal.

18. The method of claim 17, wherein the one or more features in the current biopotential signal comprises one or more of a QRS duration and a QRS axis.

19. The method of claim 18, wherein identifying the change of one or more features in the current biopotential signal relative to one or more corresponding respective features in the baseline biopotential signal comprises identifying an increase in the QRS duration in the current biopotential signal relative to the QRS duration of the baseline biopotential signal.

20. The method of claim 17, wherein indicating the degradation condition of the electronic implant comprises indicating a probable lack of capture of the electronic implant.

* * * * *